Sept. 20, 1932.  A. G. HOLMES  1,878,238

FLUID METER

Filed May 14, 1930

INVENTOR
Abram G. Holmes
By Green & McCallister
His Attorneys

Patented Sept. 20, 1932

1,878,238

UNITED STATES PATENT OFFICE

ABRAM G. HOLMES, OF PITTSBURGH, PENNSYLVANIA

FLUID METER

Application filed May 14, 1930. Serial No. 452,277.

This invention is a continuation in part of my copending application, Serial No. 300,026, filed August 16, 1928, for an invention in fluid meters such as water meters, and relates more particularly to the construction of the meter casing and the housing for the working parts of the meter.

Heretofore, it has been customary to provide one type of meter for use in warm climates and a so-called "frost-proof" type for use where freezing temperatures are encountered. All present "frost-proof" type of meters have a cumbersome outer casing or bottom so formed as to yield or break upon excessive internal pressure caused by freezing of the water within the meter, thus preventing damage to the more expensive working parts. With such a construction, it is, of course, necessary to replace the broken casing part or bottom. Such meters are used practically only in cold climates or in climates where freezing temperature is common during the late fall, winter and spring seasons.

Since the "frost-proof" type meters referred to above are only used where freezing temperatures are common, the manufacturer must provide the two types of meters, one for use in cold climates and the other for warm climates. Obviously, therefore, a larger capital is required because stock must be available to suit both demands, hence more expensive meters.

An object of the invention, broadly stated, is to provide a liquid meter that shall be applicable to both warm and cold climates and yet be no more expensive than the present warm climate meters.

Another object of this invention is to provide a liquid meter of simple and relatively cheap construction that shall be adapted for use in any locality and embody novel features of construction which render it frost-proof without providing the meter casing per se with any breakable portion or part.

A further object of the invention is to provide a frost-proof meter in which the safety feature or breakable part is housed entirely within the meter casing, and of such construction and arrangement that breakage of such part by freezing of the water will cause water to flow through the bottom of the meter housing or casing whereby such breakage is at once visibly indicated.

Other objects of the invention will, in part, be apparent to those skilled in the art and will, in part, be obvious from the following description taken in conjunction with the accompanying drawing in which:—

Figure 1:
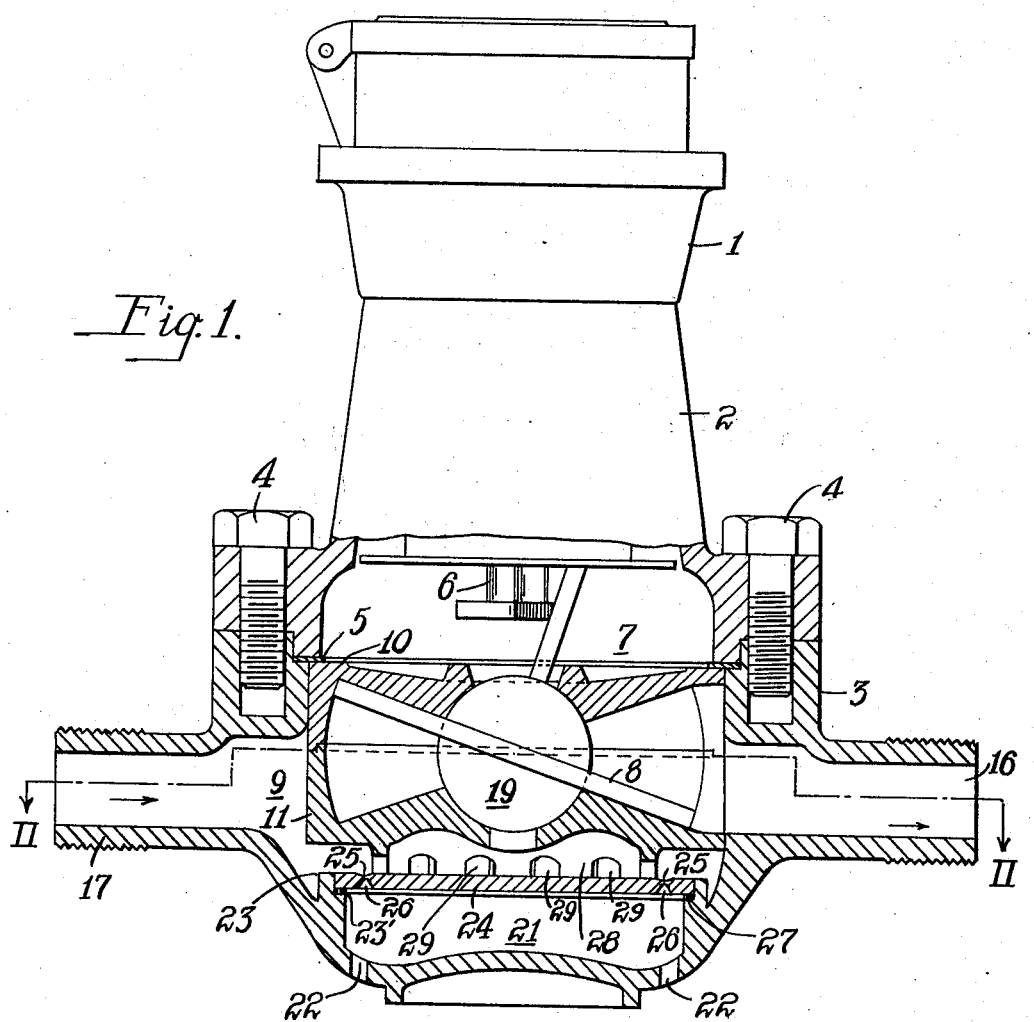
Figure 2:
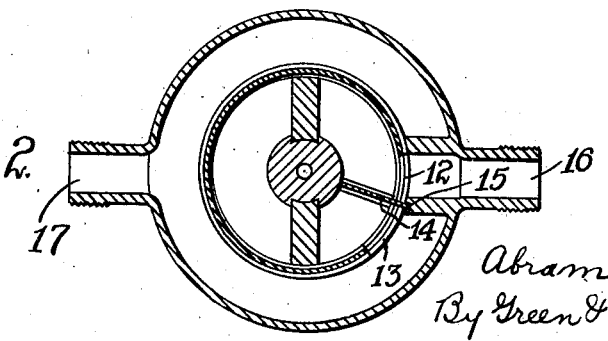

Figure 1 is a view in side elevation, partly in section, of a liquid meter embodying the invention; and Fig. 2 is a reduced view in section taken on line II—II of Fig. 1.

Throughout the drawing and the specification like reference characters indicate like parts.

In Fig. 1 of the drawing, the usual meter register container 1 is shown in connection with a casing 2. The casing 2 is provided with a removable bottom or housing 3.

The removable bottom or housing 3 is secured to the casing 2 by cap screws 4; a liquid-tight joint between the casing and the housing being obtained by a washer or packing 5.

The register mechanism in the container 1 is driven through a working part 6 by a liquid meter-motor 7. Motor 7 comprises a wabble-plate type piston 8 located in a piston chamber or meter-motor housing 9 composed of partible upper and lower sections 10 and 11.

The piston chamber 9 has two apertures or openings 12 and 13 separated by a partition 14, one edge of which is disposed in a groove or slot 15 in the housing 3 adjacent to the outlet port of the meter. The aperture or opening 12 in the piston chamber 9 registers with an outlet port 16 of the meter. Water enters the meter housing through an inlet port 17, flows through the opening or aperture 13 causing the wabble plate 8 to wabble on a spherical bearing 19 thereby permitting the water to pass through the piston chamber and the aperture 12 and out of the outlet port 16.

The housing 3 is provided at its bottom with a well portion 21 the bottom of which communicates with the atmosphere through one or more apertures 22 disposed at the periphery of the well bottom. Thus the interior of well portion 21 is in effect an open chamber. The well portion 21 is provided with an annular flange 23 having a shoulder 23' upon which is supported a breakable plate 24. A liquid tight joint may be obtained between the breakable plate 24 and annular shoulder 23' by means of a washer or packing 27, or a tight ground joint may be employed if packing is not desirable. Plate 24 normally shuts off communication between the interior of housing 3 and the atmosphere through openings 22 in the bottom well portion 21.

The breakable plate 24 is provided with annular grooves or notches 25 and 26 on the upper and lower faces thereof; said grooves being located adjacent to the annular shoulder 23' of the well portion 21. The annular notches or grooves 25 and 26 by being disposed one above the other, provide an annular restricted section in plate 24 that renders it easily breakable by expansion of the water within the meter housing upon freezing.

In order to provide a passageway for water between the bottom of the piston chamber 9 and the breakable plate 24, an open frame or support is interposed between the bottom of the piston chamber and the top face of the plate 24. This support may consist of a depending annular ring 28 having a plurality of apertures 29 therein adjacent to the upper face of the plate 24. As shown in the drawing, the ring 28 is formed as an integral part of the lower section 11 of the piston chamber 9, this being a preferred form of construction as it may be manufactured and machined more easily and at a lower cost than if the ring 28 were made as a separate part. While the depending ring 28 is illustrated as being integral with the section 11 of the piston chamber, it is to be understood that it may be made as a separate part for the purpose intended.

As water flows through the meter it passes through the space or passageway provided by the ring 28, by way of the apertures 29, and through the piston chamber 9 in the manner referred to above thereby causing the meter to register in proportion to the rate of flow of water therethrough.

If, in the operation of the meter, freezing temperatures are encountered causing the water in the meter to freeze, the breakable plate 24 may fracture or break at the restricted section afforded by the annular notches or grooves 25 and 26. The breaking of the plate 24 will cause the piston chamber 9 to separate, that is, the section 11 will drop and come to rest upon the flange 23. In this position, the depending apertured ring 28 of the section 11 will extend through the opening in the plate 24 which results when the portion thereof inscribed by the notches 25 and 26 has been broken and separated by the freezing of the water. The parting of the piston chamber 9 will render the meter inoperative so that it ceases to register.

When the plate 24 has broken, liquid, water for example, will flow into the well 21 and out of the apertures 22 thereby visibly indicating that the meter is out of order. The parting of meter piston chamber 9 also will indicate that the meter is out of order because practically no water can flow through the piston chamber to the outlet 16, hence the consumer cannot obtain the usual flow from the spigots, faucets and the like.

When the meter is to be repaired, the flow of water to the meter may be cut off and the casing 2 and container 1 removed from the housing 3 by removing the cap screws 4. The inexpensive broken plate 24 is, therefore, easily accessible, and can be readily removed and replaced by another plate. Reassembling the meter renders it operative again indefinitely until the plate 24 is again broken by reason of freezing or other excessive pressure that would be injurious to the meter.

It is to be noted that the space between the breakable plate 24 and the bottom of the section 11 of the piston chamber 9 is relatively small so that only a small quantity of liquid will be confined therein. For this reason the liquid in this space will freeze quickly and possibly sooner than the liquid within the piston chamber when freezing temperatures are encountered. In any event, either freezing of the water or liquid in the space between the breakable plate and the bottom of the section 11, or the liquid within the piston chamber 9 will cause the plate 24 to break.

If the freezing takes place within the chamber 9, the section 11 will be forced downwardly against the plate, by the expansion of the liquid, and cause the same to break.

Since the well 21 is vented to the atmosphere, the plate 24 will be colder than the piston chamber 9, because the cold air can circulate within the well. It, therefore, follows that when the atmosphere is at freezing temperature, the plate 24 may be cooled to freezing temperature while the piston chamber 9 may still be above freezing temperatures. This being the case, the liquid in the space between the plate 24 and the section 11 of the chamber 9 will freeze before the liquid in the piston chamber freezes and thereby causes the plate to break.

In the assembly of the meter, the piston chamber 9 is forced firmly against the plate 24 by the cap screws 4, these screws when drawn up causing the casing 2 to impinge on the upper section 10 of the piston chamber. It, therefore, follows that the pressure of the piston chamber upon the breakable plate 24, serves to insure a liquid tight joint between said plate and the annular shoulder 23'.

Having thus described the invention, it is to be understood that various modifications and changes may be made in the structure shown and described without departing from the spirit and scope of the invention. It is, therefore, desired that only such limitations shall be placed on the invention as are imposed by the prior art and the appended claims.

What I claim as new and desire to secure by Letters Patent is:—

1. The combination in a water meter having a housing and a measuring chamber therein, of an annular shoulder formed on the interior of the housing bottom, a breakable plate supported on said shoulder and forming a water-tight joint therewith, and an open frame for supporting said chamber on said plate in spaced relation thereto so as to provide a water chamber between said plate and the bottom of said measuring chamber.

2. The combination in a water meter having a housing and a measuring chamber therein, of an annular shoulder formed on the interior of the housing bottom, a plate supported on said shoulder and forming a water-tight joint therewith, said plate having a notch therein disposed adjacent to said shoulder thereby to cause said plate to break in response to a pressure of a predetermined value being developed within said housing, and an annular perforated ring disposed between the bottom of said measuring chamber and said plate to provide a water passageway between the bottom of said chamber and said plate.

3. The combination in a water meter having a housing and a measuring chamber therein, of a breakable plate supported in the bottom of said housing, said plate and the bottom of said housing forming a chamber, the bottom wall of said housing having openings to vent said chamber to the atmosphere, a perforated annular ring for supporting said measuring chamber on said plate so as to provide a water space between the plate and said measuring chamber, and means for supporting said plate in the housing so that water is normally prevented from reaching said second mentioned chamber.

4. The combination in a water meter having a housing and a measuring chamber therein, of a plate supported in the bottom of said housing, said plate having notches therein so arranged as to cause said plate to break in response to a pressure of a predetermined value being developed in said housing, said plate and the bottom of said housing forming a chamber, the bottom wall of said housing having openings to vent said chamber to the atmosphere, a perforated annular ring for supporting said measuring chamber on said plate so as to provide a water space between the plate and said measuring chamber, and means coacting with said plate and housing so that water is normally prevented from reaching said second mentioned chamber.

5. The combination in a water meter having a housing and a measuring chamber therein, of an annular shoulder formed on the interior of the housing bottom, a plate supported on said shoulder and forming a water tight joint therewith, said plate having a notch disposed adjacent to and inwardly of said shoulder to cause said plate to break in response to freezing of water in said housing, and an open frame for supporting said measuring chamber on said plate in spaced relation thereto so as to provide a water passageway between the measuring chamber and the plate.

6. The combination in a water meter having a housing and a measuring chamber located therein, of a chamber in the bottom of the housing, said chamber having a perforated bottom, a plate supported by said housing at the top of said chamber and disposed to normally shut off communication between the interior of the housing and said chamber in the bottom of said housing, said plate being notched to render the same breakable in response to the freezing of water in said housing, and a perforated annular ring for supporting said measuring chamber on said plate in spaced relation thereto, said ring being so constructed as to provide a water passageway between the measuring chamber and the plate.

7. The combination with a water meter having a housing and a chamber therein, said measuring chamber having an inlet port, the bottom of said housing having an opening therein communicating with the atmosphere, of a plate supported within the housing and normally closing off communication, through said opening, between the interior of said housing and the atmosphere, said plate having a notch therein disposed adjacent said shoulder to render said plate breakable in response to freezing of water in said housing, and means supporting the measuring chamber in spaced relation to the plate and so constructed as to provide a water passageway between said measuring chamber and plate, communicating with the inlet port of said measuring chamber.

8. A housing for a liquid meter having a well integral therewith, the bottom of said well having perforations therein to vent the interior of said well to the atmosphere, a plate supported in the housing and normally shutting off communication between the interior of the housing and said well, said plate having a notch therein disposed adjacent its point of support thereof to render said plate breakable in response to freezing of water in said housing.

9. A liquid meter comprising a housing open to the atmosphere through the housing bottom, a plate supported within the housing and normally shutting off communication between the interior of the housing and the atmosphere, said plate having a notch therein disposed adjacent the point of support therefor to render said plate breakable in response to freezing of water in said housing, a perforated ring on said plate and a wobble plate piston chamber disposed within the housing and mounted on said ring.

In testimony whereof, I have hereunto subscribed my name this 13th day of May, 1930.

ABRAM G. HOLMES.